United States Patent
Karlsson et al.

(10) Patent No.: US 11,325,503 B2
(45) Date of Patent: May 10, 2022

(54) WIRELESS TRAIN COMMUNICATION SYSTEM VIA ACCESS POINTS ON TRAIN POWER POLES

(71) Applicant: ICOMERA AB, Gothenburg (SE)

(72) Inventors: Mats Karlsson, Vålberg (SE); Peter Eklund, Gothenburg (SE)

(73) Assignee: Icomera AB, Gothenburg (SE)

( * ) Notice: Subject to any disclaimer, the term of this patent is extended or adjusted under 35 U.S.C. 154(b) by 0 days.

(21) Appl. No.: 16/814,660

(22) Filed: Mar. 10, 2020

(65) Prior Publication Data

US 2020/0290481 A1    Sep. 17, 2020

(30) Foreign Application Priority Data

Mar. 15, 2019    (SE) .................................. 1950325-9

(51) Int. Cl.
| | |
|---|---|
| *B60M 1/06* | (2006.01) |
| *B61L 1/12* | (2006.01) |
| *H04W 4/42* | (2018.01) |
| *H04W 88/08* | (2009.01) |
| *B61L 1/02* | (2006.01) |
| *H04W 84/00* | (2009.01) |

(52) U.S. Cl.
CPC ................. *B60M 1/06* (2013.01); *B61L 1/02* (2013.01); *B61L 1/12* (2013.01); *H04W 4/42* (2018.02); *H04W 84/005* (2013.01); *H04W 88/08* (2013.01)

(58) Field of Classification Search
CPC ... H04W 84/005; H04W 84/12; H04W 88/08; H04W 4/42; H04W 16/26; H04B 1/3822; B61L 15/0027; B61L 27/0005; B61L 1/12; B61L 2205/00; B61L 2205/02
See application file for complete search history.

(56) References Cited

U.S. PATENT DOCUMENTS

2016/0249233 A1* 8/2016 Murray ................. H04W 16/26

FOREIGN PATENT DOCUMENTS

| CN | 106533525 A | 3/2017 |
|---|---|---|
| EP | 3273745 A1 | 1/2018 |
| WO | 2015059496 A1 | 4/2015 |

OTHER PUBLICATIONS

CN106533525 eSpaceNet Patent Translation obtained May 18, 2021 of document published Mar. 22, 2017 (Year: 2021).*

(Continued)

*Primary Examiner* — Philip Sobutka
(74) *Attorney, Agent, or Firm* — Avek IP, LLC (57) ABSTRACT

Electric railway systems are disclosed. In an embodiment, the electric railway system includes a continuous conductor, access points, connections, and a microwave link. The continuous conductor runs along the railway track for supplying high-voltage power to trains travelling on the railway system, and supplies high-voltage power to trains travelling on the electric railway systems. The continuous conductor is arranged as an overhead line suspended from poles or towers distributed along the railway track. The access points provide data communication with trains travelling on the railway system, and are arranged on the poles or towers above the railway track. The connections connect the electric railway system to an electric low-voltage power cable. The microwave link connects the access points.

14 Claims, 3 Drawing Sheets

(56) References Cited

OTHER PUBLICATIONS

Extended European Search report received in related EP Application No. 20162183.6, dated Sep. 8, 2020.
Ginannetti et al., Mobile and Personal Communications in the 60 GHz Band: A Survey, Wireless Personal Communications 10: 207-243,1999.
Huber + Suhner AG, Railway Antennas Application Note, Oct. 2004.
Dipl.-Ing. Christian Sagmeister et al., Providing mobile broadband services in Austrian trains and railway stations, Signaling + Data Communication 108, Dec. 2016.

* cited by examiner

WIRELESS TRAIN COMMUNICATION SYSTEM VIA ACCESS POINTS ON TRAIN POWER POLES

CROSS REFERENCE TO RELATED APPLICATIONS

This application claims priority to Swedish application number 1950325-9, filed on Mar. 15, 2019, the disclosure of which is incorporated by reference herein in its entirety.

FIELD OF THE DISCLOSURE

The disclosure relates generally to an electric train system. More specifically, the disclosure relates to an electric train system using overhead conductor lines arranged and suspended above the railway track.

BACKGROUND

Electric train systems have been known and used for more than 100 years, and are currently in use in many railway systems around the world. Most high-speed trains are operated by electricity.

Electric train systems require costly infrastructure investments. Typically, an overhead conductor line should be arranged essentially parallel with the rail track. To this end, poles or towers are provided on one or both sides of the railway track, and along the entire length of the railway. The poles or towers holds the overhead conductor line, and also an overlying catenary or messenger line, which is held in tension, and which is connected to the overhead conductor line by so-called droppers between the poles/towers, thereby maintaining the overhead conductor in a straight configuration.

Trains travelling on the railway receives power from the overhead conductor line by a pantograph.

Such systems are disclosed in U.S. Pat. Nos. 4,679,672 and 5,881,851.

In recent years the train service has developed rapidly, and it is nowadays common to offer access to a local area network (LAN) for passengers within the train.

It is generally challenging to achieve wireless communication for mobile devices when they are moving, especially when they are moving over large distances with poor network coverage or when they are affected by unknown noise sources which interrupt communication signals. This is especially the case when clients are moving on trains, airplanes, or other types of moving vehicles. Specifically, when a client (e.g., a mobile phone) moves over large areas, it has to connect to multiple base stations in order to maintain a sufficient connection for communication.

Further, because train carriages are made of metal, and even the windows are normally covered with a metal film, train carriages are shielded compartments. As a result, direct communication between terminal antennas within the carriages and externally located antennas is difficult to obtain.

The mobile nature of a client with respect to the base stations may also introduce several potential sources of communication performance degradation. Such sources may derive from complex terrain, competition for available channels, and/or an unknown source of noise related to radio-frequency interference.

At the same time, there is currently an increasing demand from passengers to communicate through mobile phones and other handheld terminals when travelling on trains, and also to get access to the Internet via laptops, tablets, PDAs, et cetera. Further, new mobile devices (e.g., smartphones) in general require operating software applications continuously. In other words, they are active at all times. As a result, many handovers are required when a user uses such device on a moving train. Even though this problem is common for all moving vehicles, it is especially pronounced for vehicles moving at high speed, such as trains and airplanes. Trains are especially facing problems with poor line-of-sight between the base stations and the train. This puts a strain on the wireless network infrastructure, and leads to poor communication performance.

To this end, it is known to provide a mobile access router for data communication, also connected both to an external antenna and an internal antenna, in each carriage, in order to provide Internet access on board the vehicle. Such mobile access router solutions are commercially available from the applicant of the present application, Icomera AB, of Gothenburg, Sweden, and are also disclosed in EP 1 175 757 and WO 15/169917 by the same applicant. This method has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and present solutions are often unable to handle the required traffic. Further, the data traffic using cellular network communication, such as over 3G or 4G, is relatively costly.

Further, it is known to communicate with trains and other vehicles through dedicated base stations arranged sequentially along the rail track, and with a certain distance apart. Such base stations are generally referred to as trackside base stations or trackside access points, and typically operates with WLAN. However, trackside networks are extremely costly to implement, since the base stations need to be very close to each other, thereby requiring a very large number of base stations arranged close to the railway or road, and relatively evenly distributed. Thus, on the one hand trackside base stations cannot be arranged too far away from each other, since the performance deteriorates rapidly when the distance increases, however, on the other hand, closely arranged trackside base stations interfere with each other, making efficient communication problematic. Thus, implementation of trackside networks requires huge investments, and takes very long time. Despite this, it may still be difficult to obtain good coverage over the entire railway or road, and the communication performance may still be poor and inadequate. Also, high power is often needed to obtain adequate communication performance, which adds to the operation costs. Thus, known trackside communication systems are very costly both to install and to operate.

A further problem is that many wireless communication standards now use or intend to use very high frequencies, in the millimeter wavelength band. The availability of large portions of radio spectrum in the millimeter wave bands has been recognized by cellular network research and standardization bodies, notably exemplified by the use of such bands in upcoming 5G networks. Similar efforts are underlying local-area wireless network standardization bodies, as exemplified by the 60 GHz IEEE 802.11 standards. This has many advantages, but a problem with such high frequencies is that the signals are very sensitive to attenuation caused by the gases in the air, such as oxygen, thereby severely limiting the useable distance. Thus, should such high frequencies be used, the access points need to be even closer to each other, thereby increasing costs even further. Previous attempts to provide 60 GHz communication are disclosed in inter alia "Mobile and Personal Communications in the 60 GHz Band: A Survey" by F. Giannetti et al, Wireless Personal Communications 10, p. 207-243, 1999 and "Millimetre-wave propagation along railway lines" by H. Meinel et al, IEEE Proceedings, vol. 130, part F, No. 7, December 1983.

There is therefore a need for an improved method and system for communication of moving trains with increased capacity, capacity utilization, quality, and/or cost-efficiency.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an electric railway system including a continuous conductor running along a railway track, access points for data communication with a train travelling on the electric railway system, connections to an electric low-voltage power cable arranged in a track bed for providing power to the access points, and a microwave link connecting the access points. The continuous conductor supplies high-voltage power to trains travelling on the electric railway system. The continuous conductor is arranged as an overhead line suspended from poles or towers distributed along the railway track. The access points are arranged on the poles or towers at a height less than 5 m above the railway track. The access points are provided on at least every third pole or tower. The access points operate on at least two different frequencies or frequency bands, operate in compliance with IEEE 802.11 standards, operate in compliance with 5G standards, and simultaneously communicate with the train.

In other embodiments, the disclosure provides an electric railway system including a continuous conductor running along a railway track and access points for data communication with a train travelling on the electric railway system. The continuous conductor supplies high-voltage power to trains travelling on the electric railway system. The continuous conductor is arranged as an overhead line suspended from poles or towers distributed along the railway track. The access points are arranged on the poles or towers.

Optionally, the access points operate in compliance with IEEE 802.11 standards, cellular network standards, and/or 5G standards.

Optionally, the access points are arranged above the railway track.

Optionally, each access point operates simultaneously in compliance with at least two different communication standards.

Optionally, each access point operates simultaneously on at least two different frequencies or frequency bands.

Optionally, at least two access points are arranged to be in simultaneous communication with the train; and the at least two access points are in a configuration of both in front of the train, both behind the train, or at least one in front of the train and at least one behind the train.

Optionally, the access points are arranged to operate at an operating frequency above 1 GHz, preferably above 30 GHz, and more preferably above 50 GHz.

Optionally, the access points are arranged above the railway track at a height of less than 10 m, preferably less than 7 m, and more preferably less than 5 m.

Optionally, the access points are distributed along the railway track at less than 500 m between any two neighboring access points, preferably less than 400 m, and more preferably than 300 mm.

Optionally, the access points are provided on at least every fifth pole or tower along the railway track, preferably on at least every fourth pole or tower, and more preferably on at least every third pole or tower.

Optionally, the electric railway system includes connections to a fiber cable for data communication arranged in a track bed.

Optionally, the electric railway system includes connections to a low-voltage power electrical cable arranged in a track bed for providing power to the access points.

Optionally, the electric railway system includes a microwave link connecting at least two access points arranged at separate positions along said railway track.

Optionally, at least one pole or tower includes two independently operable access points, directed along the railway track in two different directions.

BRIEF DESCRIPTION OF THE DRAWINGS

Illustrative embodiments of the disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In some embodiments, an electric railway system may provide wireless communication to a train travelling on a railway system via an on-board communication system.

Figure 1:
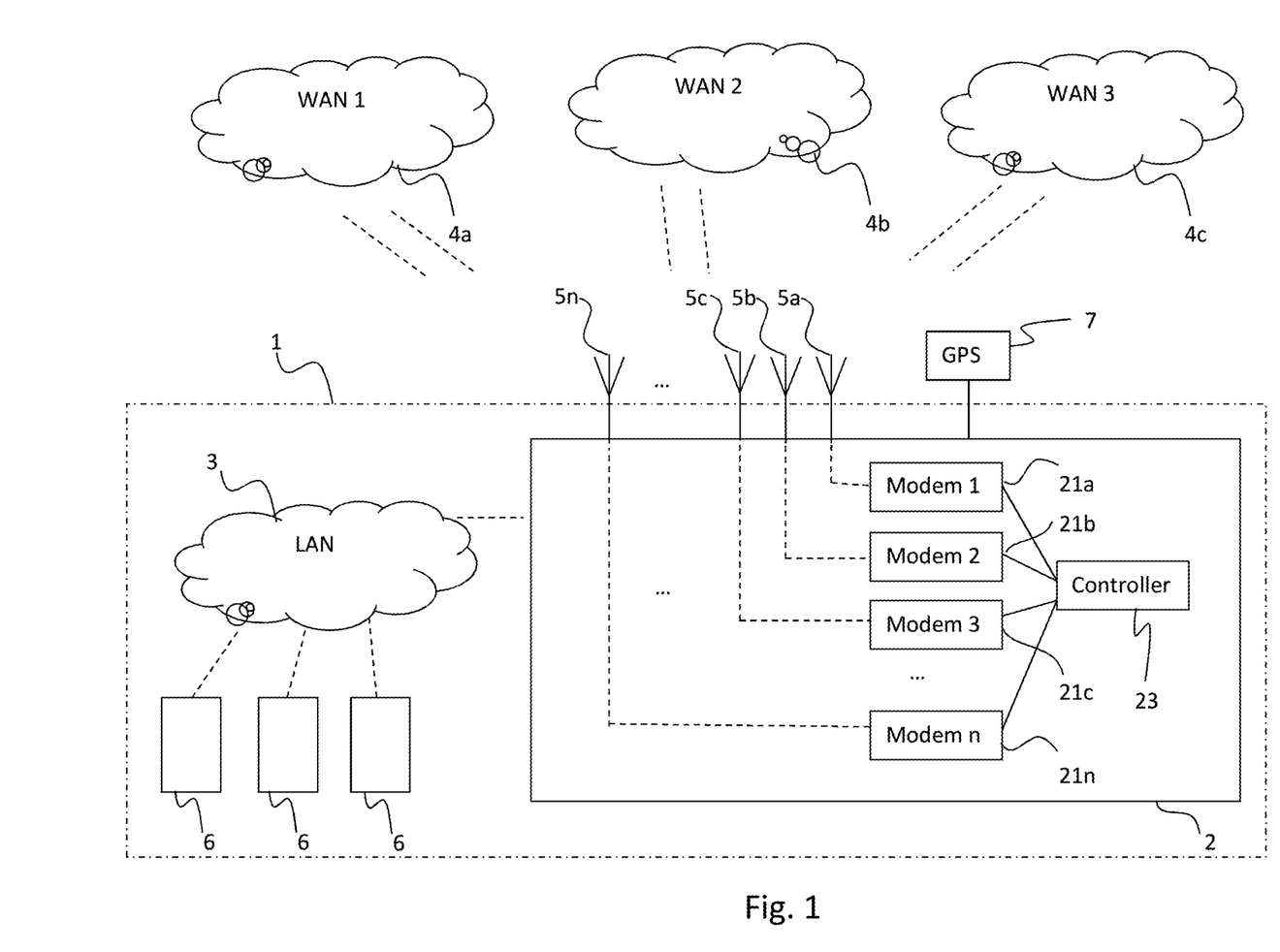
FIG. 1 is a schematic illustration of a train having a wireless communication system for communication with an electric railway system according to an embodiment of the disclosure.

Referring first to FIG. 1, a communication system of a rail-bound vehicle 1 (e.g., a train) may include a data communication router 2 which receives and transmits data between an internal local area network (LAN) 3 and one or more external wide area networks (WANs) 4a, 4b, and 4c. The communication system 1 may further include at least one external network having a plurality of trackside base stations or access points distributed along a vehicle path of travel. Communication to and from the external networks may be provided through one or several antennas 5a-5n arranged on the train. The antennas 5a-5n may be arranged on the roof of the train, on side walls of the train, or on other places of the train. The communication in may be in compliance with Wireless Local Area Network (WLAN) standards, such as the IEEE 802.11 standards. Two or more data links may be available, such as between the train and one of the WANs, using several WANs simultaneously, et cetera. The antennas 5a-5n may be directional antennas which communicate with the access points arranged on power poles or towers. The directional antennas may be directed in a forward direction (facing the travelling direction) and/or a backward direction (facing the direction opposite to the travelling direction). While only two directions are included for illustration purpose, it is to be understood that the directional antennas may further be directed in other directions, too.

The communication system 1 may include a receiver 7 for receiving GNSS Global Navigation Satellite System (GNSS) signals, such as GPS signals, indicating a position of the vehicle. The GNSS signals may be used for providing positioning data for less critical applications where the requirements for exactness and security are low. While only GPS is included for illustration purpose, the receiver 7 here may be configured to receive signals from other GNSS such as BeiDou Navigation Satellite System (BDS), Galileo System, GLONASS (Globalnaya Navigazionnaya Sputnikovaya Sistema, or Global Navigation Satellite System), Indian Regional Navigation Satellite System (IRNSS), Quasi-Zenith Satellite System (QZSS), et cetera. Optionally, the GNSS signals may be used as a complement to the position determination based on a radio signal measurement to further improve the accuracy and robustness of the position determination. Optionally, position data may be provided by the access points since they are placed at fixed positions (e.g., on the poles or towers) and the distance between the access points and the train may be determined based on round-trip measurements or phase shift measurements.

The data communication router 2 may include a plurality of modems 21a-21n. A router controller 23 may control the assignment of data streams to different WANs and/or to different data links on a WAN. The router controller 23 may be configured partially or fully as a software controlled processor, a hardware controlled processor, or a mix of the two. Optionally, the data communication router 2 be denominated Mobile Access Router (MAR) or Mobile Access and Applications Router (MAAR).

The LAN 3 may be a wireless or wired network in communication with terminal units 6 within the vehicle via one or more internal antennas. The LAN 3 may be positioned inside, outside, or proximate to the vehicle. Optionally, the LAN 3 may be set-up as wireless access point(s). The client(s) 6 may be computing devices such as laptops, mobiles telephones, PDAs, tablets, et cetera.

Figure 2:
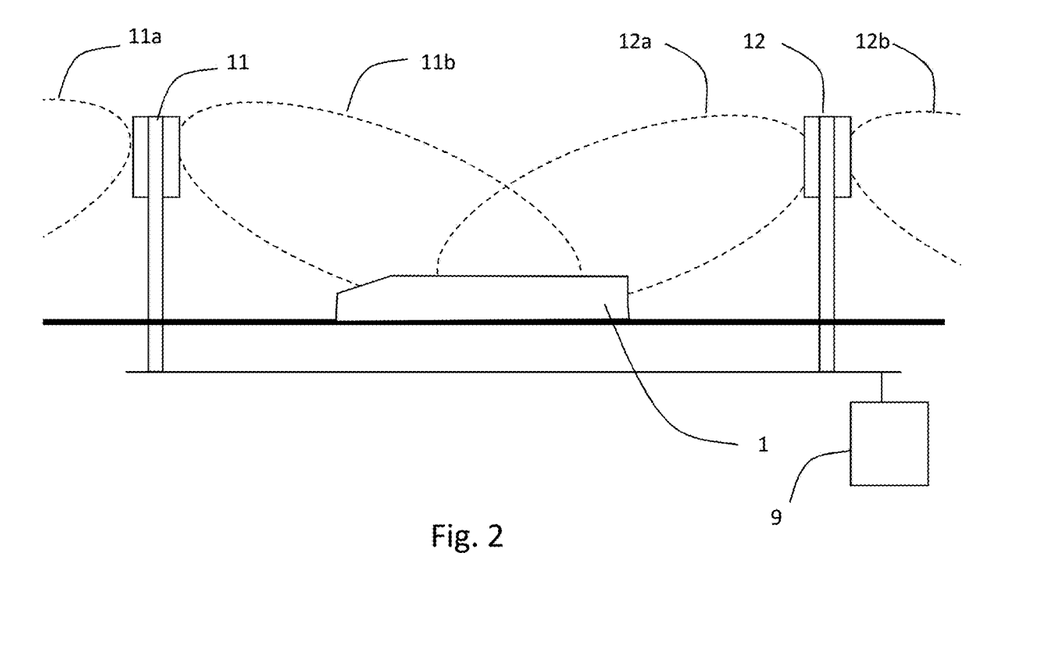
FIG. 2 is a schematic illustration of an electric railway system according to an embodiment of the disclosure.

Referring next to FIG. 2, an external wide area network (WAN) may include a plurality of trackside base stations (or access points) 11 and 12 distributed along a travelling path of a vehicle, i.e. a rail. The base stations (or access points) 11 and 12 may operate in compliance with any known telecommunications standard, optionally in compliance with Wireless Local Area Network (WLAN) standards, such as the IEEE 802.11 standards. In the non-limiting external mobile network embodiment shown in FIG. 2, the mobile network may include a plurality of trackside base stations 11 and 12 arranged along the vehicle path. Antenna devices of the base stations 11 and 12 may have coverage areas 11a-12b extending in both directions along the vehicle path. The coverage areas on respective sides of the antenna devices may be related to the same base station/access point, or to different base stations/access points. For example, the coverage area 11a and 11b may be related to the same base station/access point or related to different base stations/access points, and the coverage area 11a and 11b may be operated dependently or independently. Similar or different configurations may be implemented in the coverage areas 12a and 12b and their related base stations/access points. The access points may be directed in two different directions (nearly doubling the access range) or only in one direction on each pole or tower.

The base stations/access points may be connected to each other and to a controller 9 via a wired connection (e.g., fiber) or a wireless connection. Optionally, the fiber connection may be arranged along the railway track (e.g. in the track bed). The controller 9 may be configured partially or fully as one or more of software, hardware, or a mix of the two in a centralized or a distrusted fashion.

The coverage areas 11a-12b of the access points 11-12 may be overlapping, which may help the data communication router 2 of the vehicle to periodically or continuously access multiple access points simultaneously and distribute the communication between multiple data links. The data communication router 2 may also be connected to other external networks, and periodically and/or simultaneously distribute the communication over those networks, too.

Figure 3:
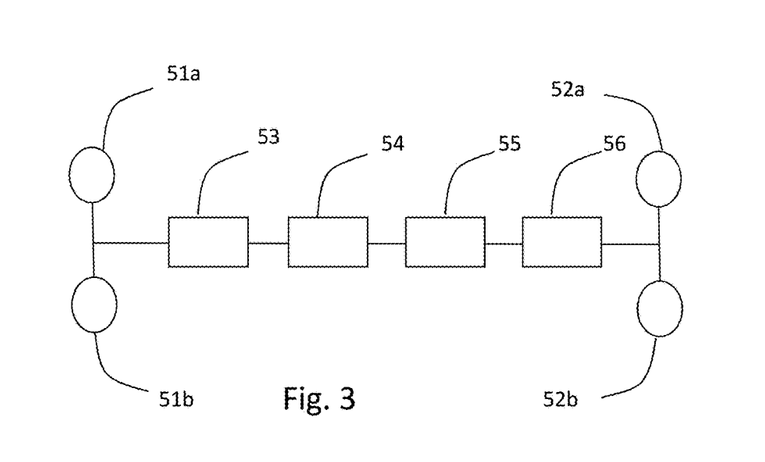
FIG. 3 is a schematic illustration of an antenna configuration in the systems of FIGS. 1 and 2.

FIG. 3 shows an antenna configuration in which a vehicle includes a plurality of antennas 51a-52b for communicating with different links and different external networks. Such antenna arrangement may be arranged on the roof of the train, in the bottom of the train, at the front side of the train, at the rear side of the train, inside the train, outside the train, or proximate to the train. Specifically, the antenna arrangement may include directional antennas 51a and 51b directed to access points in the backward direction of the train, directional antennas 52a and 52b directed to access points in the forward direction of the train, and additional antennas 53-56 arranged to communicate with base stations of other external networks, e.g. via GSM, Satellite, DVB-T, HSPA, EDGE, 1×RTT, EVDO, LTE, Wi-Fi (apart from the trackside WLAN), WiMAX, and other applicable means. The antennas 51a-52b for communication with trackside access points may be an active millimeter-wave antenna, such as an active phased array antenna for high frequencies. The operating frequency may be 5 GHz or more. Alternatively, the operating frequency of the antenna may be within the extremely high frequency (EHF) range extending between 30 and 300 GHz, which corresponds to wavelengths in the range of 1-10 mm. Optionally, the antenna may include an array of antenna elements with each element being connected to a separate transceiver. The antennas on the trackside access points may be partially or fully of the same type as the antennas on the train.

Figure 4:
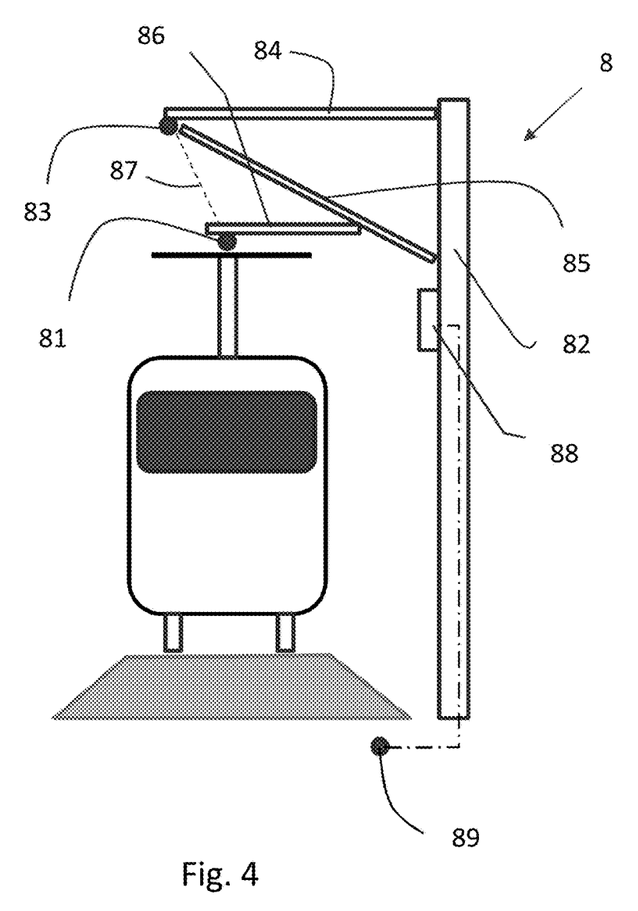
FIG. 4 is a side view of an electric railway system according to an embodiment of the disclosure.

As shown in FIG. 4, an electric railway system 8 may include a continuous conductor 81, which may be an overhead connector line running along the railway track to supply high-voltage power to trains travelling on the railway system 8. The continuous conductor 81 may be arranged as an overhead line suspended from poles or towers 82 distributed along the railway track. The continuous conductor 81 may be connected to the poles or towers 82 in various ways. For example, the continuous conductor 81 may be connected to a catenary 83 arranged above the continuous conductor 81 by means of dropper wires. The catenary 83 may be held by the tower/pole 82 by a cross-beam or transversal arm 84 extending in a generally horizontal direction and being connected to the pole/tower 82 at one end. The catenary 83 may be further stabilized by a strut 85 extending in a slanted direction between one end connected to the pole/tower 82 at a position on the transversal arm 84 remote from the pole/tower 82, and one end connected to the pole/tower 82. Alternatively, the continuous connector 81 may be connected to the pole/tower 82 by a registration arm 86 in which the continuous connector 81 may be connected to the strut 85 by a flexible tie 87.

The pole or tower 82 may be made as rigid structural elements, and may made of steel lattice or tubular steel. Alternatively, the poles or towers may be made of concrete, wood, and the like. The cross-beam or transversal arm 84, the strut 85, and the registration arm 86 may be made as rigid structural elements, and may be made of steel or other metals.

In some embodiments, one or more of the poles/towers 82 may be provided with the access points 88 for data communication with trains travelling on the railway system, in which said access points are arranged on said poles or towers. These access points may correspond to the access points 11a-12b and may be arranged to communicate at high operating frequencies, such as 60 GHz.

Access points may be arranged on every tower/pole corresponding to about 60 meters between the access points, every second tower/pole corresponding to about 120 meters between the access points, every third tower/pole corresponding to 180 meters between the access points, or every fourth tower/pole corresponding to 240 meters between the access points. Longer separation distances may also be used, depending on the frequencies used, the data rate needed, et cetera. If lower operating frequencies are used, such as 5 GHz, the distance between the access points may be even longer, such as on every fifth, or even tenth tower/pole. The access points may be distributed along the railway track at less than 500 m between any two neighboring access points, preferably less than 400 m, and more preferably than 300 m. For example, the distance may be less than 250 m, less than 200 m, less than 150 m, or less than 100 m.

The access points may operate in compliance with IEEE 802.11 (Wi-Fi) standards. Alternatively, the access points may be operating in compliance with cellular network standards, and optionally in compliance with 5G standards.

While the access points may be arranged on the poles or towers themselves, a person of ordinary skill in the art would understand that the access points may be arranged on the transversal arm or cross-beam to be arranged more directly over the railway track. For example, the access points may be arranged essentially above the railway track or slightly besides the rails (e.g. on the poles on the sides of the rails).

The transversal beam or cross-beam may be at a height of 3-4 m above the railway track. It may be patentably desirable to arrange the access points as close to the railway track as possible. Optionally, the access points may be arranged at less than 10 m from the railway track, preferably less than 7 m, and more preferably less than 5 m.

The electric railway system 8 may further include connections to a fiber cable 89 for data communication arranged in the track bed. Alternatively, the data communication between the access points may also be provided by a coaxial cable or the like, and may also be provided by microwave link connections. For example, the electric railway system may further include a microwave link connecting at least two access points arranged at separate positions along said railway track.

The power to the access points may be provided in various ways. According to an embodiment, the electric railway system may include connections to electric low-power cable arranged in the track bed. The low-power cable provides power to the access points. However, power to the access points may also be provided in other ways. For example, it is possible to obtain a high-to-low power conversion from the high power of the overhead conductor line to power the access points. In another embodiment, the power needed for the access points may be generated locally, such as by solar panels or the like arranged on the poles.

The antennas of the access points may be active antennas, such as active millimeter-wave antennas. The antenna may be phased array antennas for MIMO communication, for example in compliance with 5G standards. The antennas may include an array of antenna elements with each antenna element being connected to a separate transceiver. The antenna array may be made relatively small. For example, a length and a width extending over a few square centimeters. The whole access point may have a weight of less than 1 or 2 kg and may easily be arranged on a tower/pole.

In an embodiment shown in FIG. 2, two independently operable access points may be provided on the same pole/tower directed along the railway track in two different directions only in a single direction.

In another embodiment shown in FIG. 4, the access point may be provided on a pole having a laterally extending cross-beam or transversal arm generally forming an inverted L shape. Here, the access point may be provided on the pole itself. However, other configurations are also feasible as shown in FIGS. 5-7.

Figure 5:
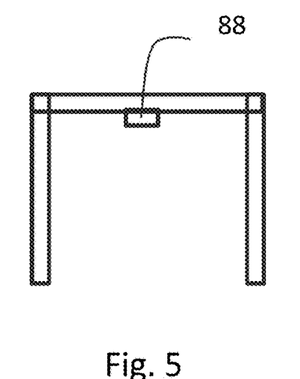
FIG. 5-7 are alternative tower embodiments of the electric railway system in FIG. 4.

As shown in FIG. 5, a tower may include two poles arranged on opposite sides of the railway track, and a cross-beam extends between the poles. Here, the access point may be provided on the cross-beam right above the track. However, it is also feasible to arrange the access point on one or both poles. In such embodiment, the cross-beam may extend over two or more railway tracks, which may provide more than one access point on the cross-beam (e.g. one over each track).

Figure 6:
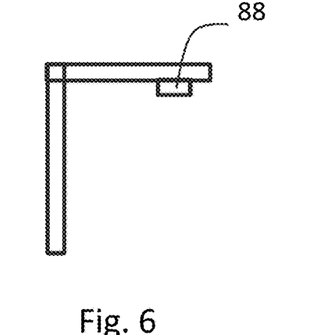

FIG. 6 illustrates an embodiment similar to the one discussed in FIG. 4 with a single pole and a transversely extending arm. However, the access point in FIG. 6 is not arranged on the pole, but on the transversely extending arm, which may be arranged more directly above the tracks.

Figure 7:
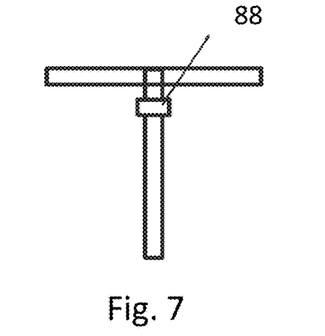

FIG. 7 illustrates another embodiment in which a single pole is provided and a beam is arranged to extend out towards both sides. Such embodiment may form two transversely extending arms extending out over two parallel railway tracks.

While the embodiments described above are generally related to trains, a person of ordinary skill in the art would understand that similar method and system may be implemented on other electrically powered rail-bound vehicles.

Various embodiments of the disclosure may have one or more of the following effects.

In some embodiments, the disclosure may use already existent towers or poles, which were originally used for providing the power to the train via the overhead line, to provide a very efficient wireless communication system. Since these towers/poles are already available, or anyway need to be mounted for new installations, the additional cost for also equipping some or all of the towers/poles with access points may be very low.

Optionally, this may be suitable for high operating frequencies, such as at 60 GHz, since the additional cost for placing the access points may be very low. The towers/poles may be conventionally arranged at about every 60 meters. Access points may be arranged on every tower/pole corresponding to about 60 meters between the access points, every second tower/pole corresponding to about 120 meters between the access points, every third tower/pole corresponding to 180 meters between the access points, or every fourth tower/pole corresponding to 240 meters between the access points. Longer separation distances may also be used, depending on the frequencies used, the data rate needed, et cetera. If lower operating frequencies are used, such as 5 GHz, the distance between the access points may be even longer, such as on every 5th, or even 10th tower/pole, However, it may also be advantageous to place even such access points closer together, since it enables use of less costly and less powerful access points.

Optionally, the access points may be separated by a separation distance exceeding 50 m, such as exceeding 100 m, 150 m, 200 m, 250 m, or 300 m. Simultaneously, the separation distance may be less than 750 m, such as less than 600 m, 500 m, 400 m, or 300 m. The separation distances may be in the range of 50-750 m, and preferably in the range of 100-500 m. The separation distance may be in one of the ranges of 50-300 m (e.g., 100-250 m) and 200-750 m (e.g., 300-500 m).

Optionally, the access points may be adapted to communicate with trains on at least two different frequencies, such as at 60 GHz, 24 GHz, 5 GHz, et cetera. The access points may communicate simultaneously on more than one frequency or frequency band. According to an embodiment, the access points may be arranged to simultaneously communicate with trains on a first frequency or frequency band within the range of 1-25 GHz, and a second frequency or frequency band within the range of 25-100 GHz. For simultaneous communication over two or more frequencies/frequency bands, each access point may be provided with two or more antennas, each antenna being assigned to communication over one of the frequencies/frequency bands.

In other embodiments, the disclosure may help to alleviate the problems with Doppler shift. Generally, if access points are arranged far from the rail, there would be great difficulties to handle the Doppler shift because the only known solution is to follow the train with high angle velocity, which is complicated to achieve in practice. However, in this disclosure, since the access points, when arranged on the towers/poles of the electrical system, are arranged very close to or even directly above the railway track and the train travelling thereon, the Doppler shift may become constant and may be easy to handle.

In further embodiments, the disclosure may be particularly important for high frequency (e.g., 60 GHz or above) communication since the beams by necessity become smaller as frequencies become higher. At 60 GHz, the opening angle may be in the range of ½-1 degree. Thus, steering the beam correctly may become much easier when the antenna is arranged closer to the train. Correspondingly, the beam steering for the antennas on the train may also become simpler and more efficient. It also may be possible to use a narrower lobe, in which the gain and data rates may be increased and the cost for installation may become lower.

In some embodiments, positioning the access points right above, or close to, the railway track may significantly facilitate handover procedures in a wireless communication, since the access points remain in connection with the train until the train passes the tower/pole, and then abruptly loose connection.

To facilitate handover procedures, the access points of the electric railway systems may be arranged to communicate with a train in such a way that the train may communicate with more than one access point at the same time (optionally at all times). This may be provided by keeping the separation distance between the access points limited so that the train may communicate with both the access point closest ahead and the access point next further ahead. The access points may be arranged to communicate with trains both in a forward and a backward direction. Here, the train may communicate not only with access points ahead, but also with access points after.

The towers/poles may be provided with access points when newly installed. However, it is also feasible to retrofit existing towers/poles with access points. According to an embodiment, two independently operable access points may be provided on the same pole/tower, and may be directed along the railway track in two different directions.

The access points may be arranged essentially above the railway track, e.g. on transversally arranged cross-beams or arms connected to the poles. However, arrangement slightly besides the rails (e.g. on the poles on the sides of the rails) is also feasible, and may provide similar advantages. The access points may be arranged above the railway track at a height of less than 10 m, preferably less than 7 m, and more preferably less than 5 m.

The access points may operate in compliance with IEEE 802.11 (Wi-Fi) standards, cellular network standards, and/or 5G standards. The access points may be arranged to operate at an operating frequency above 1 GHz, preferably above 30 GHz, and more preferably above 50 GHz. For example, at 5 GHz or 60 GHz. According to an embodiment, the operating frequency of the access points may be within the extremely high frequency (EHF) range, extending between 30 and 300 GHz, corresponding to wavelengths in the range of 1-10 mm.

The access points may be distributed along the railway track at less than 500 m between any two neighboring access points, preferably less than 400 m, and more preferably than 300 m. For example, the distance may be less than 250 m, less than 200 m, less than 150 m or less than 100 m. The access points may be provided on at least every fifth pole or tower along the railway track, preferably on every fourth pole or tower, and more preferably on every third pole or tower. The access points may also be provided on every second tower/pole, or on every tower/pole.

The electric railway system may further include connections to a fiber cable for data communication arranged in the track bed. However, the data communication between the access points may also be provided by a coaxial cable or the like, and may also be provided by microwave link connections. Additionally, the electric railway system may include a microwave link for connecting at least two access points arranged at separate positions along the railway track.

The electric railway system may further include connections to a low-power electrical cable arranged in the track bed for providing power to the access points. However, power to the access points may also be provided in other ways. For example, it may be possible to obtain a high-to-low power conversion from the high power of the overhead conductor line to power the access points. Optionally, the power for the access points may be generated locally, e.g. by solar panels or the like arranged on the poles.

The antennas of the access points may be active antennas, and preferably active millimeter-wave antennas. The antenna may be phased array antennas for MIMO communication, and may be in compliance with 5G standards. The antennas may include an array of antenna elements with each antenna element being connected to a separate transceiver. The antenna array may be made relatively small, such as with a length and width extending over a few square centimeters. The whole access point may have a weight of less than 1 or 2 kg, which may be easily arranged on a tower/pole.

The above-described embodiments of the disclosure may be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

Such and other obvious modifications must be considered to be within the scope of the disclosure, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The disclosure claimed is:

1. An electric railway system comprising:
a continuous conductor running along a railway track;
access points for data communication with a train travelling on the electric railway system;
connections to an electric low-voltage power cable arranged in a track bed for providing power to the access points; and
a microwave link connecting the access points;
wherein:
the continuous conductor supplies high-voltage power to trains travelling on the electric railway system;
the continuous conductor is arranged as an overhead line suspended from poles or towers distributed along the railway track;
the access points are arranged on the poles or towers at a height less than 5 m above the railway track;
the access points are provided on at least every third pole or tower; and
the access points operate on at least two different frequencies or frequency bands, operate in compliance with IEEE 802.11 standards, operate in compliance with 5G standards, and simultaneously communicate with the train;
wherein the at least two different frequencies or frequency bands comprises a first frequency or frequency band within the range of 1-25 GHz and a second frequency or frequency band within the range of 25-100 GHz.

2. An electric railway system comprising:
a continuous conductor running along a railway track; and
access points for data communication with a train travelling on the electric railway system;
wherein:
the continuous conductor supplies high-voltage power to trains travelling on the electric railway system;
the continuous conductor is arranged as an overhead line suspended from poles or towers distributed along the railway track;
the access points are arranged on the poles or towers, arranged to operate in compliance with IEEE 802.11 standards and at an operating frequency above 1 GHz, and arranged to operate simultaneously on at least two different frequencies or frequency bands; and
wherein the access points are distributed along the railway track at less than 300 meters between any two neighboring access points, have overlapping coverage areas, and wherein at least two access points are in front of the train are arranged to be in simultaneous communication with the train, so that the train may communicate with both the access point closest ahead and the access point next further ahead.

3. The electric railway system of claim 2, wherein the access points are arranged above the railway track.

4. The electric railway system of claim 2, wherein each access point operates simultaneously in compliance with at least two different communication standards.

5. The electric railway system of claim 2, wherein:
at least two access points are also arranged to be in simultaneous communication with the train; and
the at least two access points are in a configuration at least one in front of the train and at least one behind the train.

6. The electric railway system of claim 2, wherein the access points are arranged to operate at an operating frequency above 30 GHz, and more preferably above 50 GHz.

7. The electric railway system of claim 2, wherein the access points are arranged above the railway track at a height of less than 5 m.

8. The electric railway system of claim 2, wherein the access points are distributed along the railway track at less than 200 m between any two neighboring access points.

9. The electric railway system of claim 2, wherein the access points are provided on at least every fifth pole or tower along the railway track.

10. The electric railway system of claim 2, further comprising connections to a fiber cable for data communication arranged in a track bed.

11. The electric railway system of claim 2, further comprising connections to a low-voltage power electrical cable arranged in a track bed for providing power to the access points.

12. The electric railway system of claim 2, further comprising a microwave link connecting at least two access points arranged at separate positions along said railway track.

13. The electric railway system of claim 2, wherein at least one pole or tower comprises two independently operable access points, directed along the railway track in two different directions.

14. The electric railway system of claim 2, wherein the at least two different frequencies or frequency bands comprises a first frequency or frequency band within the range of 1-25 GHz and a second frequency or frequency band within the range of 25-100 GHz.

* * * * *